US009917804B2

(12) United States Patent
Valdivia et al.

(10) Patent No.: US 9,917,804 B2
(45) Date of Patent: Mar. 13, 2018

(54) MULTI-POST STORIES

(71) Applicant: Facebook, Inc., Menlo Park, CA (US)

(72) Inventors: Gabriel Valdivia, London (GB); Gemma Louise Silvers, Ickenham (GB); Thiago Griep Hirai, London (GB); Daniel K. Gibson, Palo Alto, CA (US); Brett R. Welch, San Francisco, CA (US); Daria Stroganova, London (GB); Razvan Racasanu, London (GB)

(73) Assignee: Facebook, Inc., Menlo Park, CA (US)

( * ) Notice: Subject to any disclaimer, the term of this patent is extended or adjusted under 35 U.S.C. 154(b) by 198 days.

(21) Appl. No.: 14/949,782

(22) Filed: Nov. 23, 2015

(65) Prior Publication Data

US 2017/0149714 A1    May 25, 2017

(51) Int. Cl.
*G06F 15/16*   (2006.01)
*H04L 12/58*   (2006.01)

(52) U.S. Cl.
CPC .............. *H04L 51/16* (2013.01); *H04L 51/32* (2013.01)

(58) Field of Classification Search
CPC ................................. H04L 51/16; H04L 51/32
USPC .................................................. 709/204–207
See application file for complete search history.

(56) References Cited

U.S. PATENT DOCUMENTS

2007/0130164 A1*   6/2007   Kembel .............. G06F 17/3089
2015/0058750 A1*   2/2015   Chakra .................. G06Q 50/01
                                                                        715/753

* cited by examiner

*Primary Examiner* — Wing F Chan
*Assistant Examiner* — Joseph Maniwang
(74) *Attorney, Agent, or Firm* — Baker Botts L.L.P.

(57) ABSTRACT

In one embodiment, a method includes receiving, at a social-networking system, an identifier corresponding to a first post item stored in the social-networking system. A first set of users is associated with the first post item. The method also includes receiving, at the social-networking system, a second post item. A second set of users is associated with the second post item. The method additionally includes associating the first and second post items with a story structure. The method further includes providing one of the post items in the story structure to a client for display.

20 Claims, 11 Drawing Sheets

MULTI-POST STORIES

TECHNICAL FIELD

This disclosure generally relates to configuring multiple social-networking posts in stories.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Multiple social-networking system posts are associated with a story structure to improve presentation of related posts and encourage increased social-networking activity. In certain embodiments, a first post item is provided by a social-networking system to a client for display. A first set of users can be tagged in the first post item. A second, related, post item and an identifier associated with the first post item is received. A second set of users can be tagged in the second post item. The first post item and the second post item are associated with a story structure. In certain embodiments, users in the first and second sets may be allowed to associate additional post items with the story structure. One or more post items from the story structure are provided to the client for display.

In certain embodiments, the first post item is provided to a client for display in a newsfeed with other unrelated post items. Permitted users can associate additional posts with the first post item within a predetermined time period (e.g., within some number of hours of submission of the first post item). If the first post item is displayed in a user's newsfeed within the predetermined time period, the first post item is displayed with an input that allows the user to add one or more related post items. In certain embodiments, when the user interacts with the input, the user is presented with an interface for creating a story by associating a new post item with the original post item. The interface may also allow the user to set permission settings regarding other users who are allowed to add related post items to the story. The interface may allow the user to set privacy settings regarding other users who are allowed to view each post item in the story. In particular embodiments, permission settings may be configurable to a fine level of granularity, e.g., certain users may have permissions to view a particular post item even when they do not have permissions to view the container for the post item or other post items in the same newsfeed.

Post items associated with a story are displayed in a chiclet-style user interface control that is horizontally scrollable in an H-style scroll pattern and optimized for rendering heterogeneous content types with the same height. In certain embodiments, the user interface displays the most recent post-item that a user associated with the display has not already viewed. In certain embodiments, a user may iteratively add posts to a story without generating additional newsfeed items. For example, posts added to a story may be added to a chiclet container horizontally adjacent to a related post item that is currently being displayed within a story structure.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
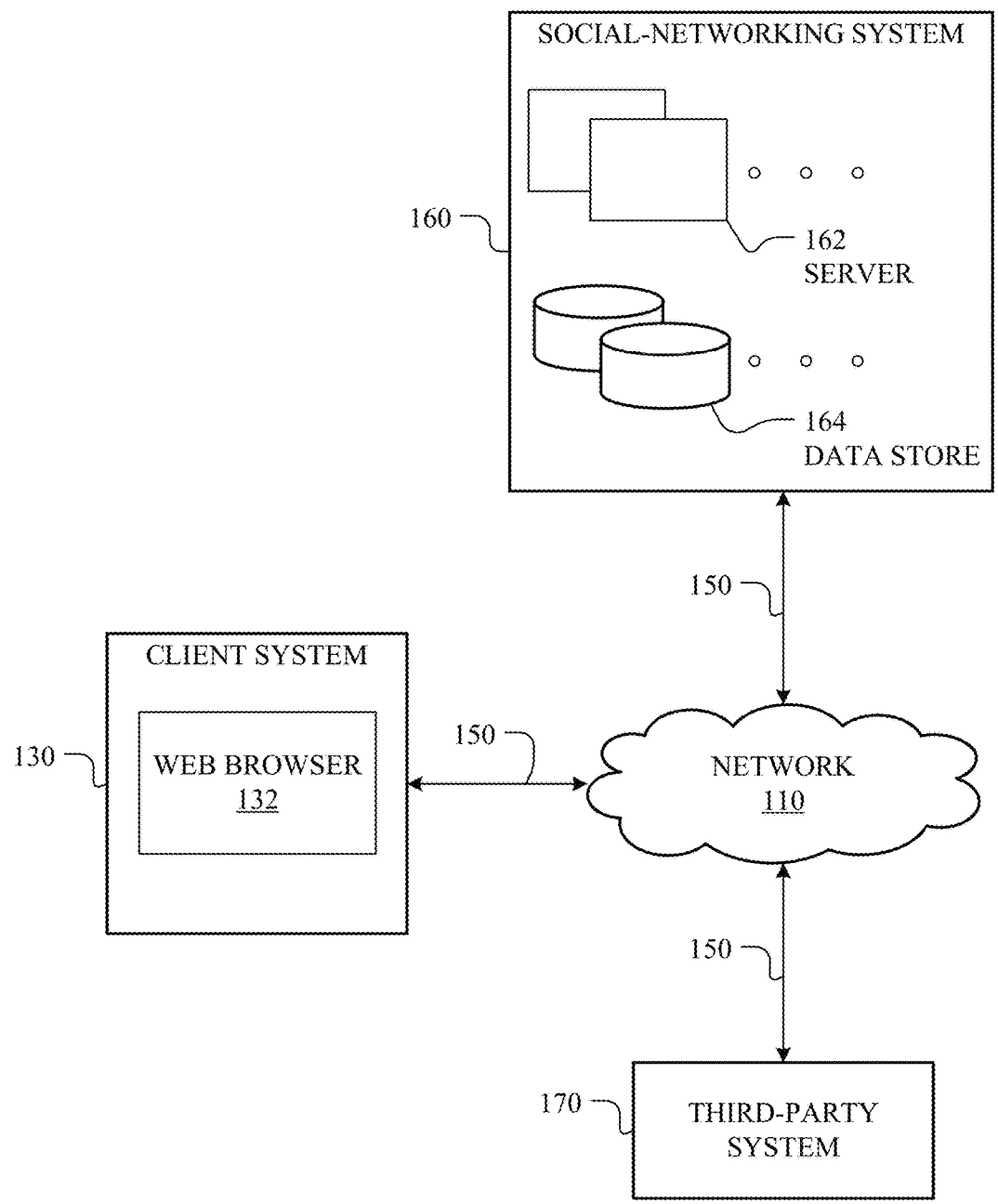
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate. More information on webpages may be found in U.S. patent application Ser. No. 11/856,202, filed 17 Sep. 2007, which is incorporated by reference.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
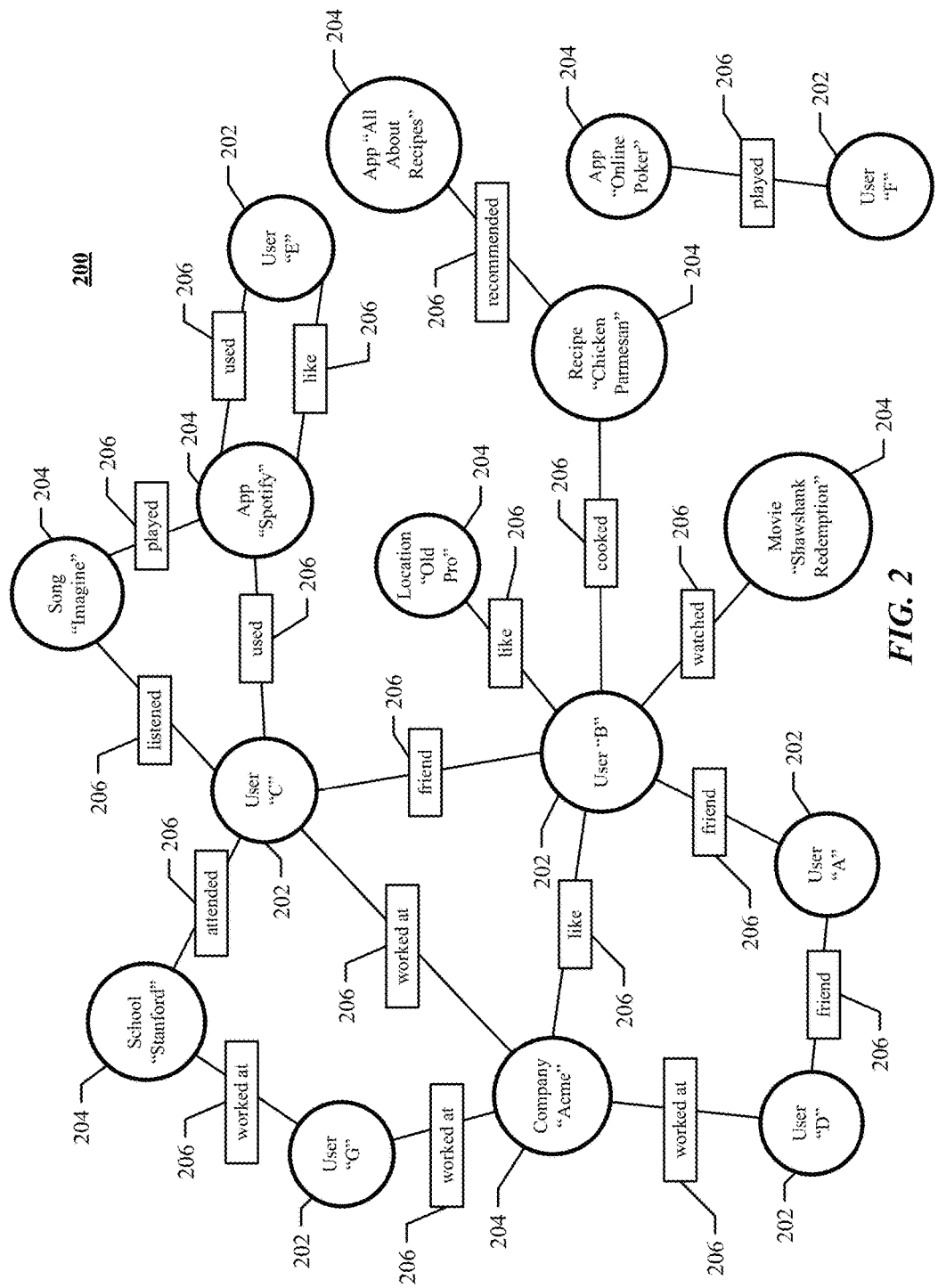
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users who have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a newsfeed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections.

In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users who are more likely to find the advertisements more relevant or useful. For example, an advertiser may realize higher conversion rates (and therefore higher return on investment (ROI) from advertising) by identifying and targeting users who are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

Multi-Post Stories

Certain social-networking systems allow users to share content, such as photo albums, locations, check-ins, videos, links, status updates, events, groups, maps, and the like. One mechanism for sharing content with other users is a "post" that is displayed via a news-feed web page, timeline, or post aggregation service. The user posting the content can "tag" particular other users in a post. When this happens, the social-networking system can generate notifications, using internal or external messaging systems, to call the tagged user's attention to the particular post. Often, users who view posts submit additional content items to the system for association with the original post. Traditionally, subsequent submissions of related content is made in the form of a "comment" on the post, a "like," or via some other interaction with the post. Some related content may, in some cases, contain additional content items and sometimes receive feedback from other users who view the post. For example, some comments can receive a "like" or an additional reply comment from other users viewing the post and related content. However, posts associated with traditional social-networking systems, may be limited in their capacity to facilitate collection and display of heterogeneous multi-media post items associated with a particular topic or event.

Moreover, some users are discouraged from interacting with social-networks by social norms that discourage frequent updates or duplicative sharing of related information. These norms may have developed in response to newsfeed or post item aggregation techniques that generate new feed items for display based on each post submission, regardless of whether the posts are related to each other. For example, a user who posts a series of 10 photos of an event in 10 separate submissions may incidentally generate 10 separate content items for display to his or her "friends." Some users may consider the display of 10 separate newsfeed items from a single user to be overbearing, annoying, or obnoxious. In view of these experiences, users may decide not to share content via the social-networking system. Other users may still post content, but may be forced to post content in an inconvenient manner (e.g., sometimes immediately submitting each post is more convenient than waiting until the end of the event, aggregating all content that the user wishes to share, and submitting the content in the form of a single post or album). This can reduce users' propensities to interact with the social-networking system.

Norms that discourage over-sharing on social-networks also affect the timeliness of posted content. For example, a user attending a new product launch may wish to post information as soon as it unfolds, but may be discouraged from posting too many entries for fear of spamming his/her friends with related content. This may result in the user delaying posts with timely information in favor of submitting a single cumulative post at the end of the event. However, multiple timely posts regarding an event may be preferable to a single delayed post.

In particular embodiments, a social-networking structure that facilitates the collection and sharing of social-networking posts of heterogeneous content types. This construct may be referred to herein for convenience as a "story," "story post," collection of "posts," collection of "mini-posts," or the like, but may have additional or alternative names. Stories enable a collection of selected, or "tagged," users within a post, as well as other users who have not been explicitly "tagged," to aggregate related content in a single story. Particular aspects of the disclosure describe privilege and tagging mechanisms for restricting viewers and editors of story content. Certain embodiments describe a user interface for interacting with a story. The user interface may include a story summary post that is generated based on the story content at a particular point in time, and describes or summarizes those content posts within the story structure. In certain embodiments, the user interface includes a swipe, horizontal scroll, or other input mechanism for displaying additional content posts associated with the story.

"Stories" provide users with a structure to share a collection of posts that focus around a central topic, theme, occurrence, or event, thus enhancing participants' social-networking experience and interaction with the event. Heterogeneous content posts associated with the story are arranged in a narrative or in chronological order for display. Stories are automatically updated with new posts so that participants, or users who are tagged in the story, can easily stay informed regarding the story without searching for or waiting for updates from a general social-networking news aggregator or feed. In certain embodiments, a mechanism for tracking that last viewed post within a story is provided so that users are presented initially with new content in a post aggregation service, yet provided the ability to scroll back and forth between old and new posts within the display container for the story. For example, this functionality can be provided in the form of a horizontally scrollable carousel-style interface. Hints regarding previous posts (i.e., posts that the consuming user has already viewed) and/or new posts (i.e., posts that the consuming user has not yet viewed) may be provided in the form of a transparent faded edge of a previous content post on the left or right side of the horizontally scrollable interface.

In certain embodiments, a story begins as a traditional post item. For example, a bride posts a "before" picture of a wedding venue early on her wedding day. Similar to a traditional post item, the bride may "tag" other users of the social-networking system in the post and set viewing or sharing permissions on the post. For example, the bride may tag several guests of the wedding, and set the viewing permissions to "Friends," which allows all users who she is connected to in the social-network to view the post, and allows tagged users' connections to also view the post. As another example, a user attending a product launch posts an initial photograph of the product launch venue stage before the presentation begins. The initial photograph is received by the social-network and shared as a post. The post is displayed to the user's friends via client devices each displaying respective newsfeeds of related users' post items.

Figure 4:
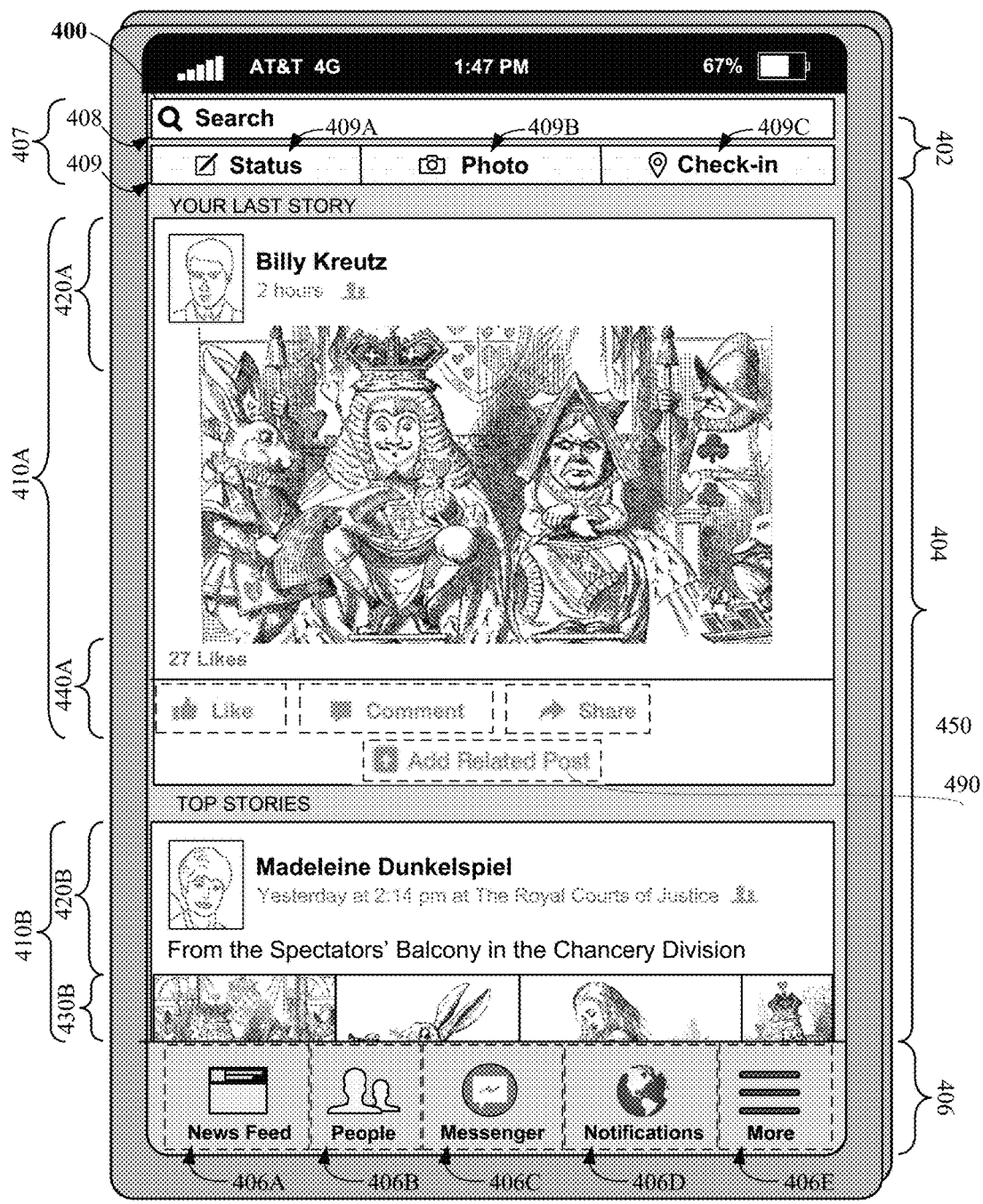
FIG. 4 illustrates an example user interface display of a picture post in a vertically scrollable newsfeed display window.

With reference to FIG. 4, an example GUI 400 for a newsfeed displaying a series of post items in a vertically scrollable interface window is illustrated. FIG. 4 also describes creating a story by adding a post to another post. In certain embodiments, a user adds a post to a social-networking system for display in a newsfeed such as, for example, GUI 400. The user that posted the initial post can create a story by adding another post to the initial post. GUI 400 is illustrated as a mobile device display, but can represent any suitable display, and is merely illustrative of an example interface component. GUI 400 includes several different static components, including status bar 402, content display region 404, and menu bar 406—in normal use (e.g., when the orientation of the device remains static), the position and/or dimensions of these regions may be fixed. Status bar 402 may display general status information, including the time (the format may be user-configurable), power status (e.g., whether the device is being charged or running on battery power, and how much battery capacity remains), and network information (identification of any network to which the mobile device is connected, as well as the strength of the network signal). Menu bar 406 may display a number of different menu buttons corresponding to different tabs, including "News Feed" button 406A, "People" button 406B, "Messenger" button 406C, "Notifications" button 406D, and "More" button 406E. The interactive regions for each of these buttons is shown by the dashed line. Within the dashed line for a particular button, a tap gesture may be detected and applied as user input indicating that the particular tab has been selected.

Content display region 404 may detect and apply vertically-scrolling user input (e.g., user input 450) to reveal additional entries in the list of news feed items 450. In the view shown in FIG. 4, region 404 includes three GUI components: header 407 (comprising search box 408, which may be tapped in order to begin receiving character input, and publisher bar 409, which may include interactive menu buttons 409A-C to allow the user to tap to post a "Status" message, upload a "Photo," or "Check-in" to a location) and news feed items 410A and 410B. Item 410B depicts an example traditional post item, while item 410A depicts an example story item. Each news feed item 410 itself includes a number of GUI components: a header section 420, a posted-content section 430, and an interaction section 440. As shown with respect to news feed item 410A, header section 420A may include various GUI components, such as personal information associated with a poster of news feed item 410A and information related to news feed item 410A itself. Interaction section 440A includes status information about user interactions with news feed item 410A as well as several interactive button regions (as shown by the dashed lines).

Figure 3:
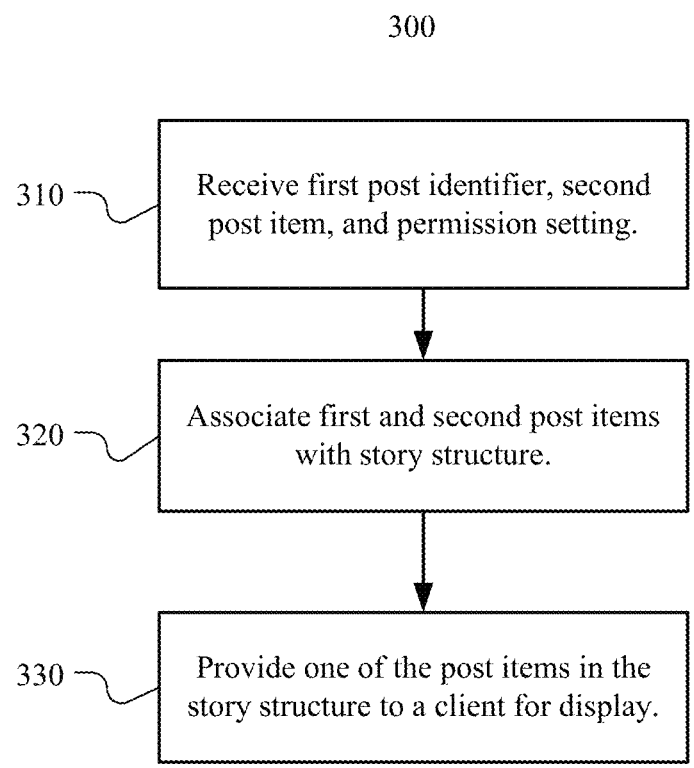
FIG. 3 illustrates an example flow chart of a method for a multi-post story.

In certain embodiments, a user interface input is provided in association with the original post that provides the poster of the original post with the ability to post a second related post. When submitted to the social-networking system, this second related post creates a story, and provides many additional capabilities for sharing content related to a particular event. With reference to method 300 illustrated in FIG. 3, the second related post submission corresponds to step 310. At step 310, a first post identifier, second post item, and permission setting is received, for example, at a social-networking system. In certain embodiments, the first post identifier identifies the original post item that the new post is being associated with. The second post item includes the new post item, and the permission setting describes users who are able to post additional related post items.

Figure 5:
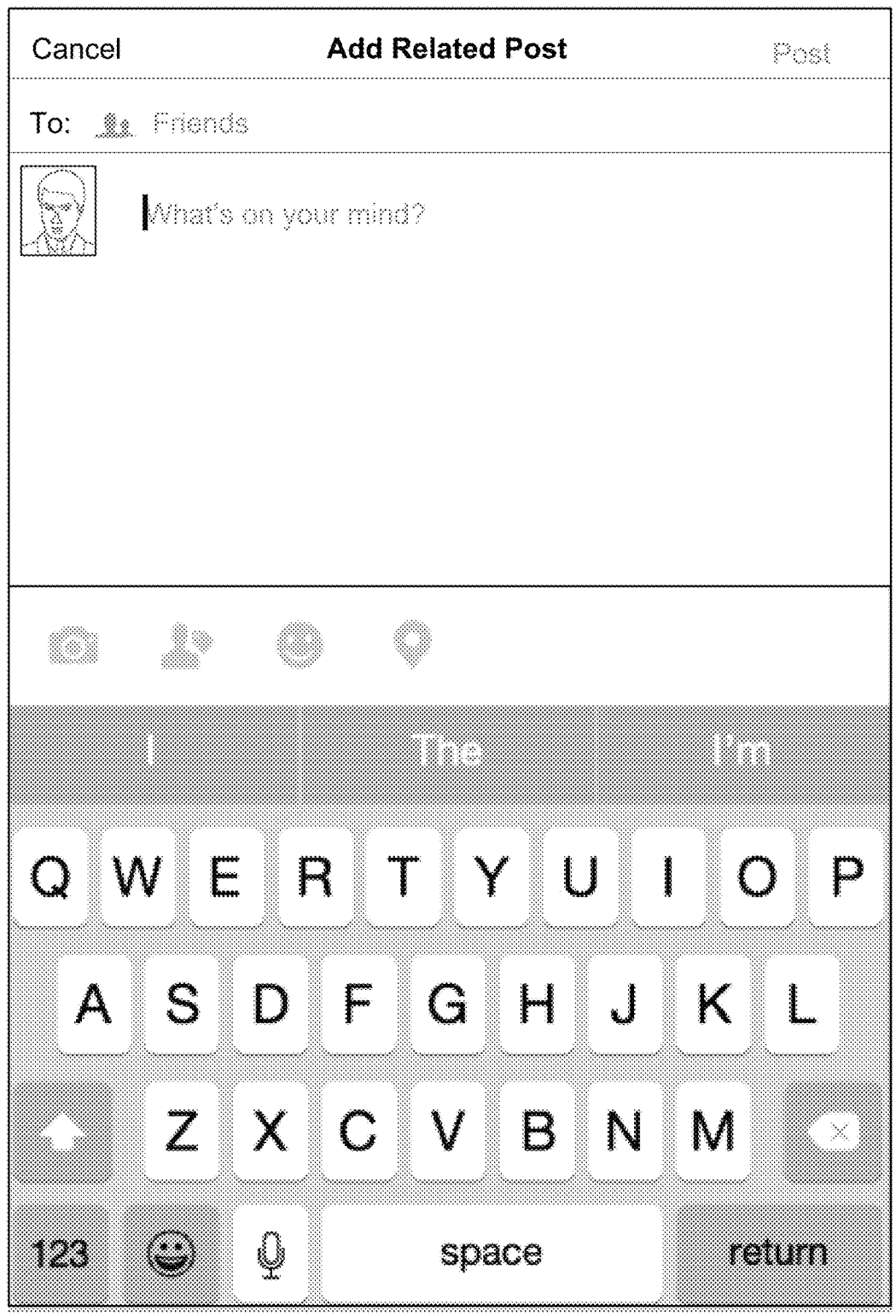
FIG. 5 illustrates an example user interface for adding a related post to an existing post to create a story.

For example, shortly after posting the "before" picture post described above, flowers arrive at the venue. The bride wishes to post another post depicting the flowers that is related to her earlier post. The bride selects an "Add Related Post" button associated with the "before" picture post item. An example embodiment of such an interface button is shown in FIG. 4 as button 490. In certain embodiments, when button 490 from FIG. 4 is selected, an interface is displayed that allows the user to create a related post item. For example, the example interface illustrated in FIG. 5 may be displayed. Multi-media content is selected using the input buttons displayed in input panel 520 and displayed in post content window 510. The bride selects one or more pictures, videos, or other content items that show the flowers she wishes to share using the content selection items in display 520.

As another example, the user at the product launch captures a video of the introduction section of the product launch, in which the company launching the product hypes up the crowd for the launch of the product with various effects. The user selects the video using media selection buttons 520 and the video is displayed in content window 510.

In certain embodiments, permitted users are allowed to associate additional content items with the initial post item or story structure within a predetermined time period. For example, "Add Related Post" button 490 may only be displayed with the initial post item or displayed story for, for example, six hours from the time that the initial post item was submitted. In certain embodiments, the time period resets after each new post is associated with the story. For example, if one or more users submit additional related posts, the predetermined time period resets after each submitted post that is associated with the story. In this example, the time period within which to associate additional related posts with the story can be extended based on the continued submission of related posts within the time period.

Figure 6:
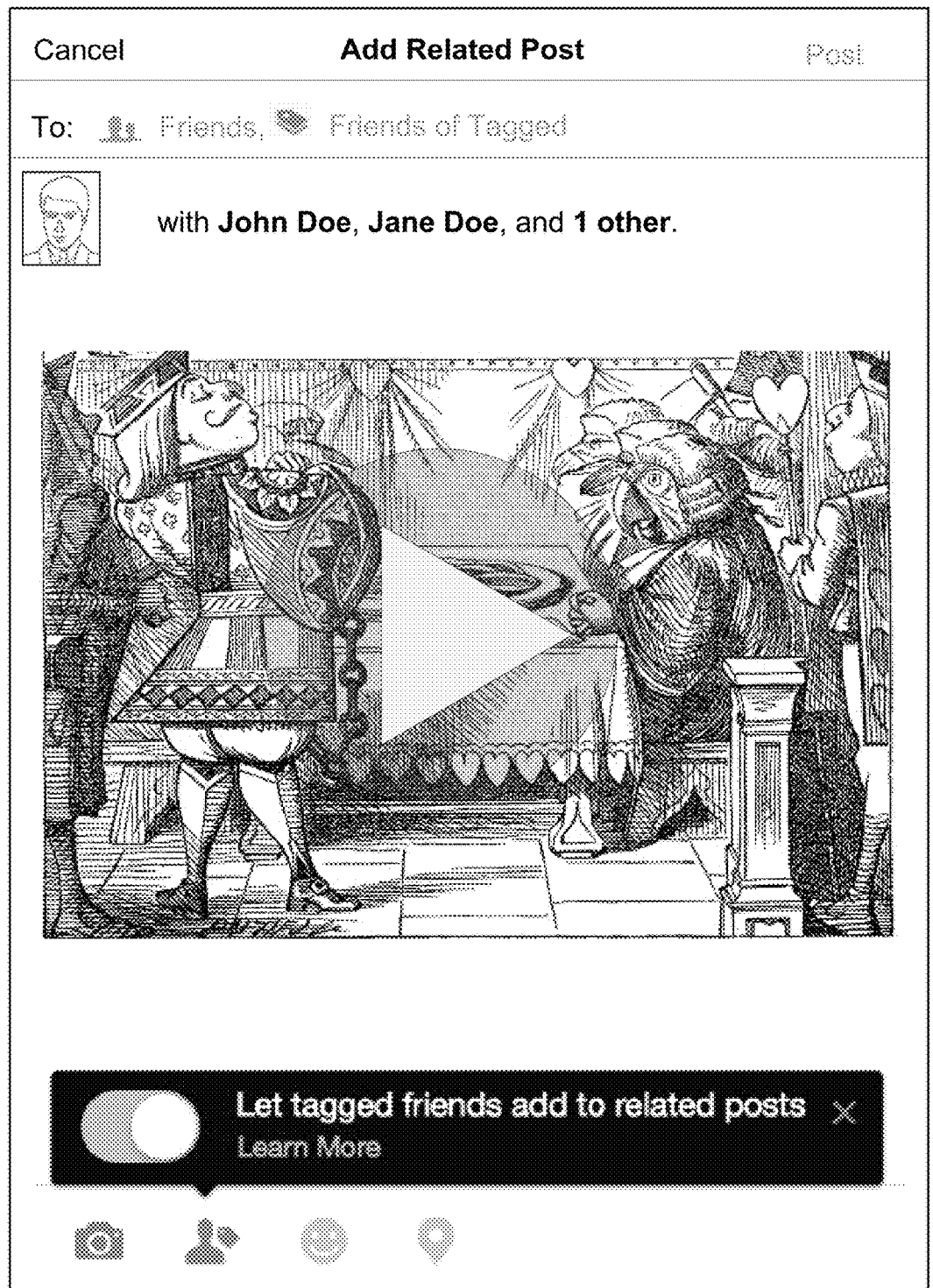
FIG. 6 illustrates an example user interface for adding a related post to an existing post to create a story in which a video post had been added, privacy settings have been specified, and story editing settings have been specified.

With reference to FIG. 6, an interface for creating a story or adding to an existing story by adding a post to another user's post is illustrated. The content item(s) selected in the examples described above (e.g., with reference to FIG. 5) are displayed in content viewing window 610 of a composer interface. Content viewing window may be capable of displaying any type of multi-media post item, including, but not limited to, photos, videos, check-ins, maps, text, links, and the like. For example, the bride selects several pictures of the flowers and adds them as a multi-picture post that is displayed in content window 610. The bride can enter additional text thanking the florist for providing the flowers using a keypad (e.g., such as the keypad illustrated in FIG. 5). As another example, the user attending the product launch selects the captured video, which is now displayed in content viewing area 610.

In certain embodiments, the user may be presented with an option to immediately share in a related post any captured video, text, location, third party application link, or other content item directly from a separate interface window. For example, a user taking a picture can post an image directly from the camera application. When the user takes a second picture, the user may be asked if he/she would like to share the second picture in a post related to the previously shared picture. Various other user interface enhancements for allowing users to share related content items are contemplated within the scope of the present disclosure.

In certain embodiments, users are tagged in the post. For example, users can be tagged in an image in which they appear. As another example, users generally associated with content to be posted can be referenced in relation to new post items. With reference to FIG. 6, the users John Doe, Jane Doe, and one other are "tagged" or referenced in association with the new post item. For example, the bride may tag the florist responsible for preparing the flowers, as well as family members and friends in the post. As another example, the user attending the product launch can tag the company launching the product in the video, as well as a companion that is accompanying the attendee at the product launch.

In certain embodiments, privacy settings specifying a set of users who are able to view the current post are specified. With reference to FIG. 6, panel 630 shows that "Friends" and "Friends of Tagged" are able to view the post item. In this example, social-networking connections of the poster, as well as social networking connections of John Doe, and Jane Doe will be able to view the post item. The permission settings are specific to each post item. For example, users permitted to view second or subsequent related post items may be unable to see the first post item if a smaller subset of users was permitted to view the original post item. This characteristic is described in more detail below with reference to the display of stories.

In certain embodiments, permission settings specifying a set of users who are able to add related posts to the story are specified. The user posting the related post item specifies users who are able to add related posts to the story. Panel 620 shows a permissions button that allows users to specify whether tagged friends can add related posts. In certain embodiments, this feature is only enabled when posting a related post item. In certain embodiments, each post creation interface may allow the posting user to specify a set of users who are allowed to add related posts. For example, the bride allows tagged users to add related posts to the story, which may encourage attendees and other guests to associate content items, such as pictures of the reception, with the original posts and overall wedding social-networking story. As another example, the user attending the product launch does not allow other users to post related content items to the product launch story, since the like and comment forum provided with respect to each post item is probably sufficient to receive feedback from friends and other social-networking system connections.

The content selected for the post may be consolidated in a data model that can handle various content types. For example, since the content posted can include heterogeneous content types, such as videos, pictures, photo albums, shares, links, etc., the single data model is equipped to handle these various content types. The data model may also be extendable to handle various other content types not yet created. Content created in the composer interface of FIGS. 5 and 6 can be packaged in an instance of this data model and transmitted to the social-networking system for identification and association with a post channel. Type identifiers and other attributes of the object can be used to identify the embedded content.

Returning to FIG. 3, when the user submits the related post item to the social-networking system, for example, by clicking the "Post" button on the interface of FIG. 6, the social-networking system associates the first and second post items with a story structure in accordance with step 320. The social-networking system may store the related posts in a story data structure that facilitates the linking of related posts, as well as the enforcement of privacy considerations and editing permissions specific to stories. Finally, the social-networking system may provide one or more of the post items in the multi-post story structure to a user for display in accordance with step 330.

In certain embodiments, a multi-post story consists of a list of status update objects linked together by a common container object. The container object may be referred to as a "post channel." In particular embodiments, a post is created from the composer interface illustrated in FIGS. 5 and 6. The posts owner is presented with a prompt to add related posts to the original post to create a story. The owner creates a second post, appending it to the first post and linking them both to a newly-created container object. The user may then continue adding additional posts to the channel. In certain embodiments, the post channel privacy model is similar to privacy settings for a photo album. Privacy for the channel is delegated to the privacy settings for each post. However, a viewer may be able to see a post even if they don't have permission to view the post channel. For example, if a post channel with privacy set to "Friends" contains a post with privacy set to "Friends of Tagged," then tagged users' friends who are not in the "Friends" group may be able to view the individual post item without the surrounding related post items.

In certain embodiments, view permissions are handled at the post level. For example, a first user is granted permission to view a first post item in a multi-post story, but is not granted permission to view a second post item in the multi-post story. This situation may arise in the case where "Friends of Tagged" users are permitted to view the post. For example, if one user is tagged in the first post, but is not tagged in the second post in the story, the friends of the person tagged in the first post will be able to view the first post, but will not be able to view the second post in the story. Users who are allowed to view one post in a story may not be able to view all posts in the story. In certain embodiments, any user who can view a particular post in a story can comment on or "like" that particular post.

Figure 7:
FIG. 7 illustrates an example chiclet-style interface for displaying post items associated with a story structure with associated "like" and "comment" summaries in a horizontally and vertically scrollable H-Scroll interface.

In certain embodiments, the related post items are displayed in a post aggregation interface, such as the newsfeed interface of FIG. 7. Story post item 710 in the newsfeed interface is shown with video post item 720 and picture post item 730. Post item 720 is displayed first in the vertically scrollable newsfeed interface. Dashed line 720 denotes a horizontally scrollable area of the story container displayed in the newsfeed interface. Each post item is displayed in a chiclet-style display interface. The chiclet display interface is well adapted to display content items of various types in a control structure having a uniform height. Uniform height between post items is ideal for displaying content items in a horizontally scrollable carousel interface, or other such interface for displaying related post items in a story container. The chiclet container includes space for the content item, as well as a summary display 750 that summarizes related content, such as comment and "like" information (e.g., "3 likes and 7 comments" as opposed to the actual comments or a listing of the users who "liked" the post). Posts within the story container can be displayed in chronological order in a carousel-style interface that displays other related content items. For example, horizontally scrolling left and right through the displayed post tiles progresses through posts in the story in chronological order. Previews of the next post in the queue are positioned at the left and right sides of the currently displayed tile. Transparency and other effects may be applied to adjacent tiles.

Figure 8:
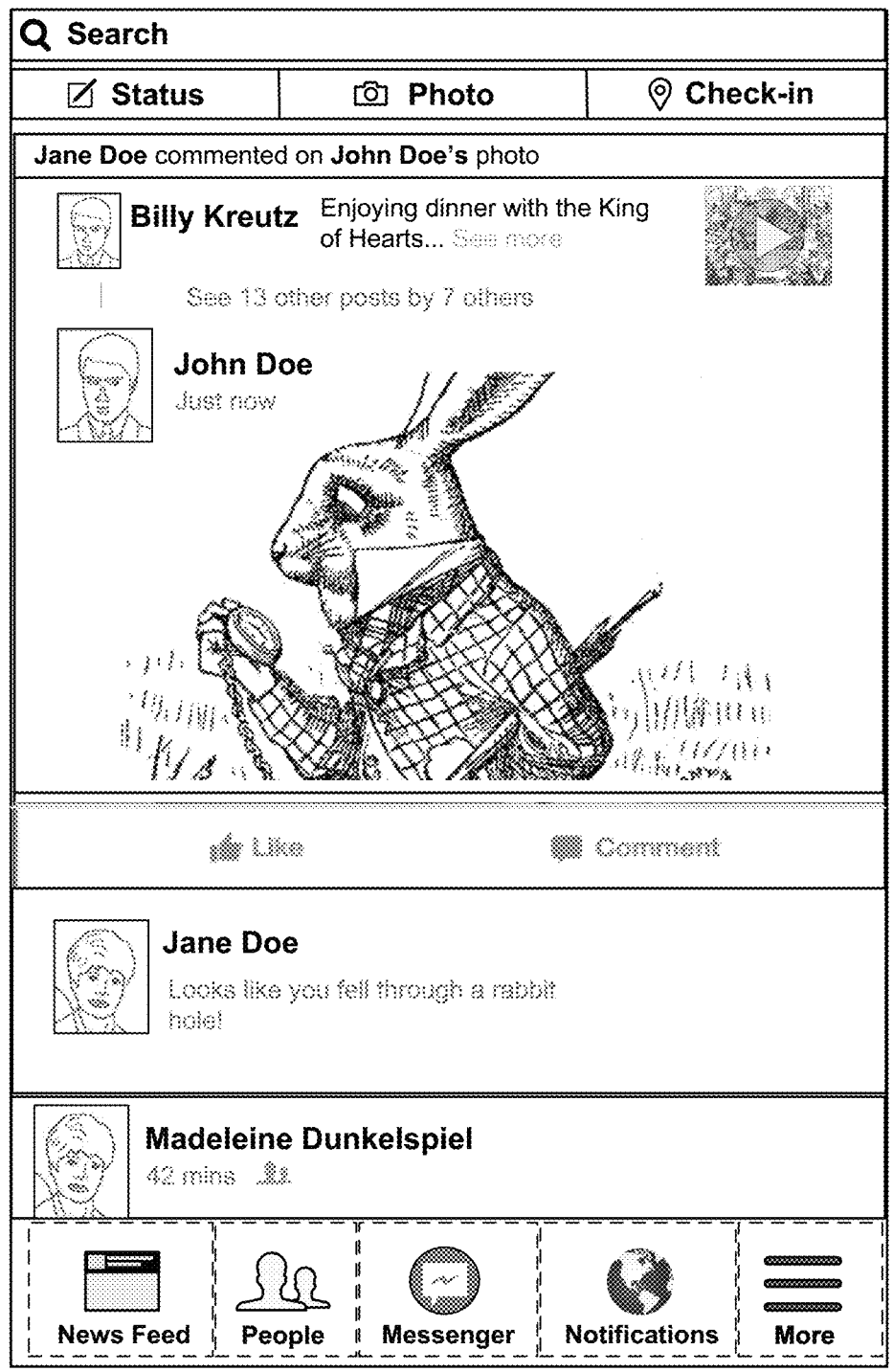
FIG. 8 illustrates an example user interface for displaying additional "like" and "comment" content associated with a particular post item in a story structure.

In certain embodiments, posts in the story can be selected or highlighted to display additional information. For example, with reference to FIG. 8, a post item within a story is selected and additional information regarding the post is displayed. Additional information can include comments and "like" information, such as particular users who have "liked" the post. Summary information regarding other post items in the story can also be displayed (e.g., "See 13 other posts by 7 others").

Figure 9:
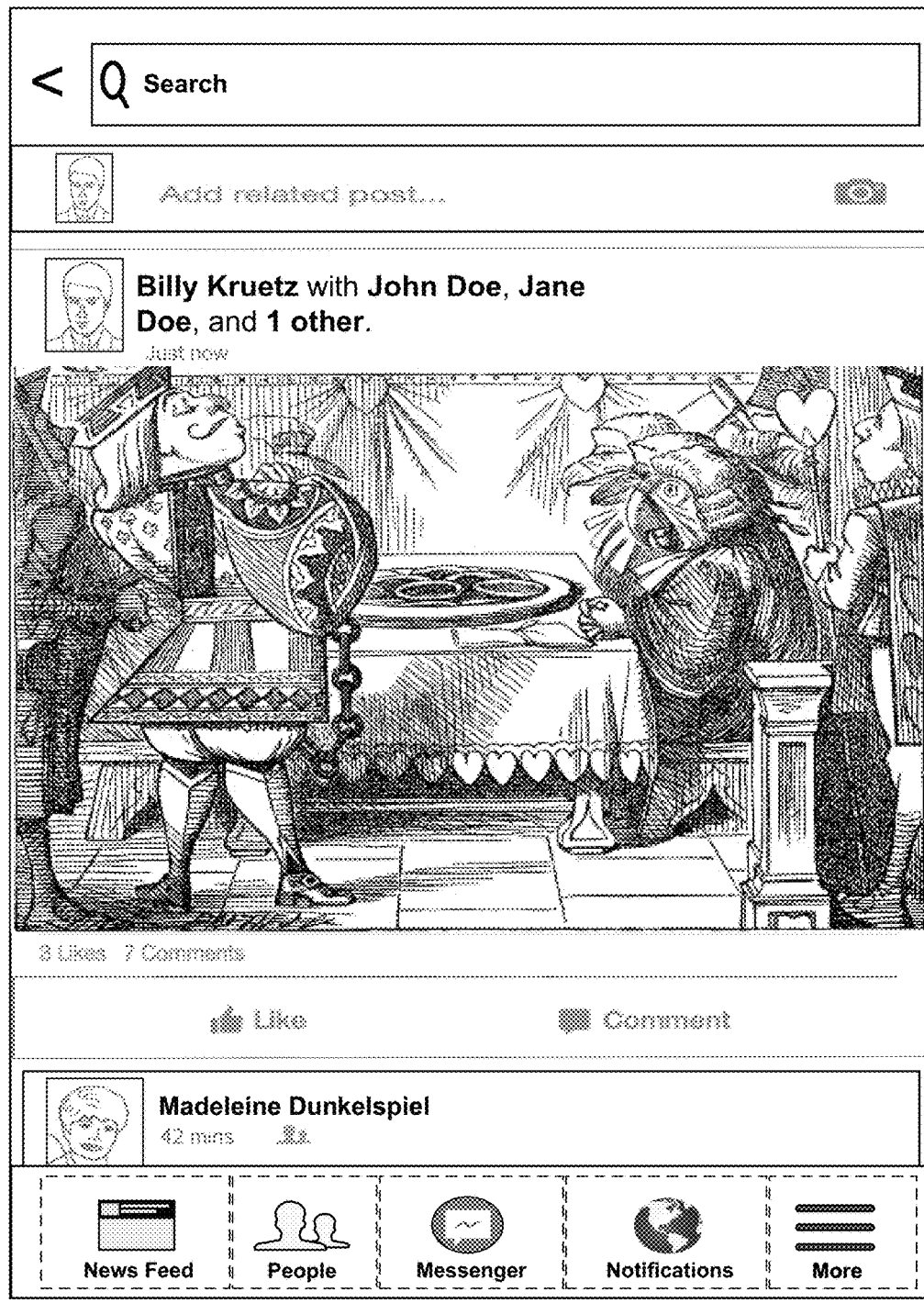
FIG. 9 illustrates an example chiclet-style interface for displaying post items associated with a story structure with "like" and "comment" summaries and an interface for liking and/or commenting on the displayed post.
Figure 10:
FIG. 10 illustrates a user interface displaying content associated with a post that is associated with a story structure.

With reference to FIGS. 9 and 10, example user interfaces for displaying additional information associated with a post within a story are illustrated. It may not be practical to display detailed information regarding additional content related to a post within the story container due to space considerations. However, additional "permalink" displays or webpages are generated for each post that contain such detailed information, and permit further commenting, liking, and association of related posts.

Stories permit a group of users to share various content types associated with an event in a central structure. For example, attendees of the wedding described in the example above, as well as social-networking system users who will not attend the wedding, such as relatives who are too remote to travel to the wedding, can share their experiences of the event through multi-media story posts in a running thread. Other tagged users can view, add to, comment on, and/or otherwise enjoy the wedding through these shared experiences. For example, guests at the wedding who are allowed to add related posts to the bride's story add additional photos of the reception. Still other users can be explicitly granted privileges regarding the story, such as privileges that enable viewing, editing, or commenting on the story.

As another example, a charitable organization creates a story to collectively share a fundraising bike race event. The organization tags users corresponding to participants, volunteers, and riders in the story, as well as beneficiaries of the fundraising proceeds. Other users may request admission to view or add posts to the story. Riders may share videos of training activities, while volunteers share pictures of their preparations for the event. This content is aggregated in a story that showcases these diverse experiences and facilitates social-networking interaction involving the organization.

Such collective experiences may be difficult or impossible to collect and share with other users using traditional social-networking post objects. For example, individuals can post pictures to a social-networking system using traditional post objects, but no unifying thread, theme, or mechanism is provided that automatically combines these contributions, stores them together, and presents them as a story. Using the above example, race participants post pictures of training activities. However, without any unifying thread, or story, to post to, these experiences may not be shared with those users who are most inclined to interact with or enjoy sharing in those experiences. As another example, a distant relative may take a unique picture of a couple exchanging wedding vows from an angle that the professional photographer is not able to reach. Without a story to unite those interested users, such experiences may not be shared with the most interested participants.

In certain embodiments, a story processing module arranges posts within the story for display to a user. Posts can be arranged in chronological order based on metadata associated with content in each post item without regard to the order in which the content was posted. For example, if a guest at a wedding posts pictures of the wedding the night after attending the wedding, the story can be modified to add the pictures in the story at the time they were taken. In particular embodiments, posts can be arranged in order to create a narrative of the event. Location information may be used to select posts from various groups of people. For example, several volunteers at a finish line of a fundraising race can take pictures of participants crossing the finish line while race participants take videos of race conditions during the race. Each of these content types may include location metadata that describes the location and time of the photograph/video. The story can be arranged to select posts for display in order to present an account of the event that is representative of each of these groups by selecting content from various locations. For example, a video from one participant during the race is displayed before one or two pictures from the finish line. Thus, story viewers are presented with various view points of the event through the various posts.

A story summary can be displayed in connection with a container or container cover page and can display summary information regarding the embedded story, such as a number of posters, a number of likes received by various embedded posts, a number of comments, a number of posts, as well as a listing describing who posted each item, and any additional information contained within the story. The story summary can also include a collage of images, videos, and other content types that have been posted to the story. The story summary contains an expandable interface that a user can interact with to expand posts within a story. The user can interact with the story summary to post content to the story or comment on the summary itself.

In certain embodiments, associating posts with each other in a story structure reduces or eliminates the stigma of "spamming" friends with social-network posts. Multiple posts associated with each other are displayed in a single user interface segment of the post aggregation service to reduce or eliminate redundant notifications regarding each post. For example, a story tile appears once in a user's vertically scrollable newsfeed. The story tile may include a series of horizontally scrollable chiclet-style containers that each contain a post item. Each chiclet container includes a summary of information associated with the post item, such as comments and likes. Thus, while the depth of information regarding each particular post is slightly reduced, each post is still accessible to the consuming user via the horizontally scrollable interface. Irritation due to any redundant posts, however, may be reduced as the user vertically scrolls through various other unrelated newsfeed stories. Accordingly, users may feel more comfortable posting additional content to the social-networking system in the form of related posts, which may increase utility and enjoyment of the social-networking system by all users.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users who may access the work experience information on the user-profile page, thus excluding other users from accessing the information. In particular embodiments, the privacy settings may specify a "blocked list" of users who should not be allowed to access certain information associated with the object. In other words, the blocked list may specify one or more users or entities for which an object is not visible. As an example and not by way of limitation, a user may specify a set of users who may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 11:
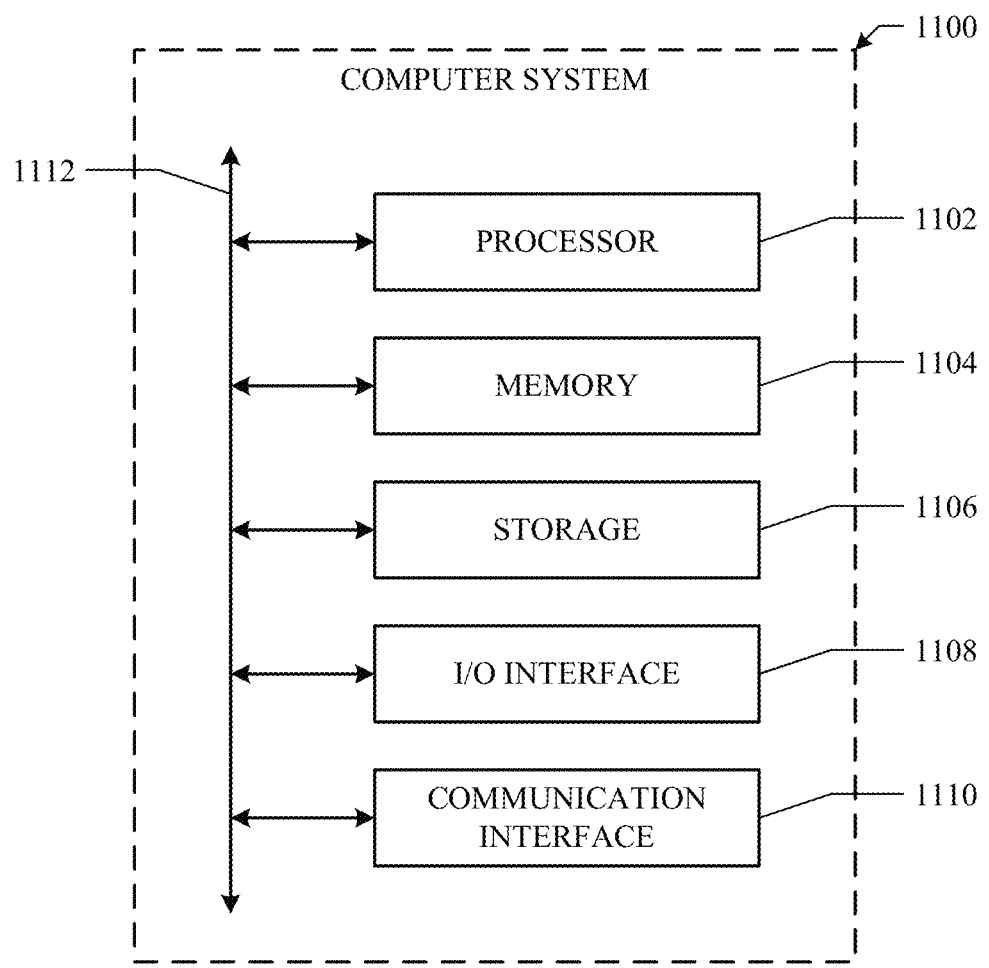
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by one or more processors, receiving, at a social-networking system:
      an identifier corresponding to a first post item stored in the social-networking system, wherein a first set of users is associated with the first post item; and
      a second post item, wherein a second set of users is associated with the second post item;
   by the one or more processors, associating the first and second post items with a story structure;
   by the one or more processors, providing one of the post items in the story structure to a client for display in a user interface control with other post items associated with the story structure, wherein the user interface control is displayed within a content window that comprises other post items that are not associated with the story structure, wherein the user interface control is scrollable along a first axis, and wherein the content window is scrollable along a second axis, perpendicular to the first axis; and
   by the one or more processors, in response to receiving a scroll input corresponding to the one of the post items associated with the story structure, providing another post item associated with the story structure to the client for display in the user interface control.

2. The method of claim 1, further comprising:
   receiving a permission setting indicative of whether the users in the first and second sets are allowed to associate additional post items with the first and second post items; and
   determining whether to allow users in the first and second sets to associate additional post items with the story structure based on the permission setting.

3. The method of claim 1, further comprising:
   receiving, from one of the users in the first or second set, a third post item and an identifier associated with the story structure; and
   associating the third post item with the story structure.

4. The method of claim 1, wherein providing one of the post items in the story structure further comprises:
   selecting a most recent post item, associated with the story structure, that a user, associated with the client, has not yet viewed; and
   providing the selected post item to the client.

5. The method of claim 1, further comprising:
   displaying the one of the post items associated with the story structure in a horizontally scrollable control within a vertically scrollable content window with other post items that are not associated with the story structure, the horizontally scrollable control comprising other post items associated with the story structure;
receiving a horizontal scroll input corresponding to the one of the post items associated with the story structure; and
displaying another post item associated with the story structure in the vertically scrollable content window.

6. The method of claim 1, wherein the receiving further comprises:
receiving a privacy setting indicative of, for each post item associated with the story structure, a second set of users of the social networking system that are allowed to view the post item.

7. The method of claim 1, wherein each user in the corresponding users for the first set of user identifiers is associated with at least one of the post items associated with the story structure.

8. The method of claim 1, further comprising:
receiving content associated with a first post item associated with the story structure; and
providing a summary of the content to the client for display with the first post item.

9. The method of claim 8, further comprising:
receiving an identifier corresponding to the first post item; and
providing the content associated with the first post item to the client for display.

10. The method of claim 1, wherein each post item associated with the story structure has a respective content type, the respective content types comprising:
one or more picture content types;
one or more video content types; and
one or more text content types.

11. One or more computer-readable non-transitory storage media embodying software that is operable when executed to:
receive, at a social-networking system:
an identifier corresponding to a first post item stored in the social-networking system, wherein a first set of users is associated with the first post item; and
a second post item, wherein a second set of users is associated with the second post item;
associate the first and second post items with a story structure;
provide one of the post items in the story structure to a client for display in a user interface control with other post items associated with the story structure, wherein the user interface control is displayed within a content window that comprises other post items that are not associated with the story structure, wherein the user interface control is scrollable along a first axis, and wherein the content window is scrollable along a second axis, perpendicular to the first axis; and
in response to receiving a scroll input corresponding to the one of the post items associated with the story structure, provide another post item associated with the story structure to the client for display in the user interface control.

12. The computer-readable media of claim 11, further comprising software that is operable when executed to:
receive a permission setting indicative of whether the users in the first and second sets are allowed to associate additional post items with the first and second post items; and
determine whether to allow users in the first and second sets to associate additional post items with the story structure based on the permission setting.

13. The computer-readable media of claim 11, further comprising software that is operable when executed to:
receive, from one of the users in the first or second set, a third post item and an identifier associated with the story structure; and
associate the third post item with the story structure.

14. The computer-readable media of claim 11, wherein providing one of the post items in the story structure further comprises:
selecting a most recent post item, associated with the story structure, that a user, associated with the client, has not yet viewed; and
providing the selected post item to the client.

15. The computer-readable media of claim 11, further comprising software that is operable when executed to:
display the one of the post items associated with the story structure in a horizontally scrollable control within a vertically scrollable content window with other post items that are not associated with the story structure, the horizontally scrollable control comprising other post items associated with the story structure;
receive a horizontal scroll input corresponding to the one of the post items associated with the story structure; and
display another post item associated with the story structure in the vertically scrollable content window.

16. The computer-readable media of claim 11, wherein the receiving further comprises:
receiving a privacy setting indicative of, for each post item associated with the story structure, a second set of users of the social networking system that are allowed to view the post item.

17. The computer-readable media of claim 11, wherein each user in the corresponding users for the first set of user identifiers is associated with at least one of the post items associated with the story structure.

18. The computer-readable media of claim 11, further comprising software that is operable when executed to:
receive content associated with a first post item associated with the story structure; and
provide a summary of the content to the client for display with the first post item.

19. The computer-readable media of claim 11, further comprising software that is operable when executed to:
receive an identifier corresponding to the first post item; and
provide the content associated with the first post item to the client for display.

20. A system comprising: one or more processors; and a non-transitory memory coupled to the processors comprising instructions executable by the processors, the processors operable when executing the instructions to:
receive, at a social-networking system:
an identifier corresponding to a first post item stored in the social-networking system, wherein a first set of users is associated with the first post item; and
a second post item, wherein a second set of users is associated with the second post item;
associate the first and second post items with a story structure;
provide one of the post items in the story structure to a client for display in a user interface control with other post items associated with the story structure, wherein the user interface control is displayed within a content window that comprises other post items that are not associated with the story structure, wherein the user interface control is scrollable along a first axis, and wherein the content window is scrollable along a second axis, perpendicular to the first axis; and in response to receiving a scroll input corresponding to the one of the post items associated with the story structure, provide another post item associated with the story structure to the client for display in the user interface control.

\* \* \* \* \*